US012771235B2

(12) United States Patent
Rudiak et al.

(10) Patent No.: US 12,771,235 B2
(45) Date of Patent: Oct. 20, 2026

(54) SYSTEM COMPRISING A GATE DRIVER

(71) Applicant: NXP USA, INC., Austin, TX (US)

(72) Inventors: Jerry Rudiak, Phoenix, AZ (US); Burton Jesse Carpenter, Austin, TX (US); Fred T. Brauchler, Canton, MI (US)

(73) Assignee: NXP USA, Inc., Austin, TX (US)

( * ) Notice: Subject to any disclaimer, the term of this patent is extended or adjusted under 35 U.S.C. 154(b) by 237 days.

(21) Appl. No.: 18/652,889

(22) Filed: May 2, 2024

(65) Prior Publication Data

US 2024/0380307 A1 Nov. 14, 2024

(30) Foreign Application Priority Data

May 12, 2023 (EP) .................................... 23173245

(51) Int. Cl.
*H02M 1/088* (2006.01)
*H02M 7/00* (2006.01)
*H02M 7/537* (2006.01)

(52) U.S. Cl.
CPC ........... *H02M 1/088* (2013.01); *H02M 7/003* (2013.01); *H02M 7/537* (2013.01)

(58) Field of Classification Search
CPC ....... H02M 1/088; H02M 7/003; H02M 7/537
USPC ........................................................ 307/108
See application file for complete search history.

(56) References Cited

U.S. PATENT DOCUMENTS

| | | | | |
|---|---|---|---|---|
| 9,035,422 | B2 | 5/2015 | Khanolkar et al. | |
| 9,673,809 | B1 | 6/2017 | Kandah et al. | |
| 10,446,476 | B2 | 10/2019 | Higgins, III et al. | |
| 10,734,312 | B2 | 8/2020 | Carpenter et al. | |
| 2011/0140255 | A1 | 6/2011 | Liu et al. | |
| 2013/0055052 | A1 * | 2/2013 | Kaeriyama | G06F 11/08 714/799 |
| 2019/0326897 | A1 | 10/2019 | Murakami et al. | |
| 2022/0190818 | A1 | 6/2022 | Heckroth et al. | |
| 2023/0085441 | A1 | 3/2023 | Rudiak et al. | |

* cited by examiner

*Primary Examiner* — Michael R. Fin

(57) ABSTRACT

A system comprising a first gate driver comprising: a first die including a first controller for controlling a gate of a first power switch; a second die arranged with the first die and galvanically isolated from the first die, the second die comprising communication circuitry; wherein the first die includes a first connection element and the second die includes a second connection element, wherein the first and second connection elements are configured to provide a communication channel between the galvanically isolated first die and second die; and wherein the second die comprises at least one communication terminal for coupling to a second gate driver comprising a second controller, the second controller for controlling a gate of a second power switch; wherein the communication channel provides for communication between the first controller and the second controller.

18 Claims, 6 Drawing Sheets

SYSTEM COMPRISING A GATE DRIVER

CROSS-REFERENCE TO RELATED APPLICATIONS

This application claims the priority under 35 U.S.C. § 119 of European Patent application no. 23173245.4, filed on 12 May 2023, the contents of which are incorporated by reference herein.

FIELD

The present disclosure relates to a system comprising a gate driver. It also relates to a system comprising a first gate driver and a second gate driver. The present disclosure also relates to an electric vehicle comprising the system.

BACKGROUND

Control of high voltage traction inverters such as for operating a traction motor or other electrical devices is difficult due to the need to operate in a high voltage domain. Control is usually accomplished by relaying signals into a low voltage domain and then controlling pulsed width modulation (PWM) via a microcontroller (MCU) in the low voltage domain.

SUMMARY

According to a first aspect of the present disclosure there is provided a system comprising: a first gate driver comprising:

- a first die including a first controller for controlling a gate of a first power switch;
- a second die arranged with the first die and galvanically isolated from the first die, the second die comprising communication circuitry;
- wherein the first die includes a first connection element and the second die includes a second connection element, wherein the first and second connection elements are configured to provide a communication channel between the galvanically isolated first die and second die; and
- wherein the second die is coupled to at least one communication terminal for coupling to a second gate driver comprising a second controller, the second controller for controlling a gate of a second power switch; and
- wherein the communication channel provides for communication between the first controller and the second controller.

In one or more embodiments the first power switch and the second power switch comprise part of a respective limb of an inverter. In one or more examples the inverter is configured to convert DC power to AC power for application to an electric motor.

In one or more embodiments, the second die is stacked with the first die and a galvanic isolation layer therebetween provides said galvanic isolation, and wherein the first connection element comprises a first coil and the second connection element comprises a second coil, wherein the communication channel is provided by the first and second coils being configured to provide an inductive communication channel through the galvanic isolation layer.

In one or more embodiments, the second die is arranged adjacent the first die, and wherein the first connection element and the second connection element comprise corresponding parts of an optocoupler arrangement, and thereby the communication channel comprises an optical communication channel.

In one or more embodiments, the second die is arranged adjacent the first die, and wherein the first connection element comprises a first capacitor arrangement and the second connection element comprises a second capacitor arrangement, wherein the communication channel comprises a capacitive communication channel further provided by one or more bondwires extending between the first capacitor arrangement and the second capacitor arrangement.

In one or more embodiments, the first die includes a first supply voltage terminal for receiving a first supply voltage and a first reference terminal for receiving a first reference voltage; and

- the second die includes a second supply voltage terminal for receiving a second supply voltage and a second reference terminal for receiving a second reference voltage, wherein one or both of the first reference voltage and the second reference voltage are different and the first supply voltage and the second supply voltage are different.

In one or more embodiments, the second die is configured to receive at least a fault signal from the second controller of the second gate driver via the communication terminal, wherein the second die is configured to communicate the occurrence of a fault indicated by receipt of the fault signal to the first controller via the communication channel.

In one or more embodiments, the first gate driver comprises a package including a third die, wherein the third die is galvanically isolated from the first die and the second die and is communicatively coupled to the first die, wherein the third die includes interface circuitry to provide an interface to a microcontroller.

In one or more embodiments, the first controller of the first die is configured to operate in a first high voltage domain comprising the voltage domain of the first power switch; and

- the communication circuitry of the second die is configured to operate in a second high voltage domain, different to the first high voltage domain, and comprising the voltage domain of the second power switch; and
- the interface circuitry of the third die is configured to operate in a low voltage domain.

In one or more embodiments, the first controller is configured to communicate with the second controller selectively via the communication channel and the second die or via the third die and the microcontroller.

In one or more embodiments, the second gate driver comprising a fourth die including the second controller, wherein the second controller includes a high-voltage communication terminal coupled to the communication terminal of the second die.

In one or more embodiments, the fourth die includes a fourth supply voltage terminal for receiving the second supply voltage and a second reference terminal for receiving the second reference voltage.

In one or more examples, the communication channel provides for bidirectional communication between the first controller and the second controller. In other examples, the communication channel provides for unidirectional communication between the first controller and the second controller. In such an example, the second gate driver may have a similar structure to the first gate driver in order to provide for unidirectional communication between the first controller and the second controller.

In one or more embodiments, the second gate driver includes:

a fifth die arranged with the fourth die and galvanically isolated from the first die, the fifth die comprising second communication circuitry;

wherein the fourth die includes a third connection element and the fifth die includes a fourth connection element, wherein the third and fourth connection elements are configured to provide a second communication channel between the galvanically isolated fourth die and the fifth die; and wherein the fifth die comprises at least one communication terminal;

wherein the first die includes a second high-voltage communication terminal; and wherein the at least one communication terminal of the fifth die is coupled to the second high-voltage communication terminal of the first die to provide for communication from the first controller to the second controller via the second communication channel.

In one or more embodiments, the fifth die is configured to receive at least a fault signal from the first controller of the first gate driver via the second high-voltage communication terminal and the at least one communication terminal of the fifth die, wherein the second communication circuitry of the fifth die is configured to communicate the occurrence of a fault indicated by receipt of the fault signal to the second controller via the second communication channel.

In one or more examples, the second gate driver comprises a package including a sixth die, wherein the sixth die is galvanically isolated from the fourth die and is communicatively coupled to the fourth die, wherein the sixth die includes second interface circuitry to provide an interface to the microcontroller.

In one or more examples, the second controller of the fourth die is configured to operate in the second high voltage domain comprising the voltage domain of the second power switch and the voltage domain of the second die; and the second communication circuitry of the fifth die is configured to operate in the first high voltage domain comprising the voltage domain of the first power switch; and the second interface circuitry of the sixth die is configured to operate in the low voltage domain.

In one or more embodiments, the first gate driver and the first power switch, wherein the first gate driver is coupled to a gate terminal of the first power switch; and the second gate driver and the second power switch, wherein the second gate driver is coupled to a gate terminal of the second power switch.

In one or more examples, the first die and the second die are arranged in the same package.

According to a second aspect of the present disclosure there is provided an electric vehicle comprising the system of the first aspect, the electric vehicle including an electric motor, wherein the electric motor is powered at least in part by the first power switch and the second power switch, wherein the electric motor provides motive power for the electric vehicle.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets.

The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

Control of high voltage traction inverters such as for operating a traction motor or other electrical devices is difficult due to the need to operate in a high voltage domain. Control is usually accomplished by relaying signals into a low voltage domain and then by a pulsed width modulation (PWM) communication scheme to a microcontroller (MCU) in the low voltage domain. However, such control via the low voltage domain microcontroller has been found to take time, which for some requirements is not ideal.

Examples described herein relate to control of the gate driver that is accomplished locally in the high voltage domain. The embodiments show examples of how to overcome the issue that different gate drivers are referenced to different common potentials, which makes high voltage domain communication challenging.

In general terms, we present an apparatus that utilizes galvanic isolation and a communication channel therethrough for communicatively connecting different gate drivers and allowing communication between different gate drivers in the high voltage (HV) domain. In some examples, this can provide improved communication between gate drivers.

In one or more examples, when faults occur in a first gate driver (e.g. a “high side” gate driver), communication to the complementary, second gate driver (e.g. a “low side” gate driver) is not easily accomplished without transferring communication signaling to a low voltage domain. This is typically because the reference to common (ground) of the high side driver is a switching phase node, and the reference to the low side driver is a DC Bus (−) node. Therefore, there is a large difference in voltage between the two common voltage values which prevents these two gate drivers from communicating directly. Typical application circuits tradeoff control time to route the faulted signal back to the low voltage domain and then offload control to the MCU which controls the complementary driver via PWM to compensate for the fault. This indirect communication adds a lag time to the control.

It is desirable to allow for (e.g. near) real time communication in the HV domain of the complementary gate driver circuitry between gate drivers without requiring transmitting information back to the low voltage domain MCU.

Figure 1:
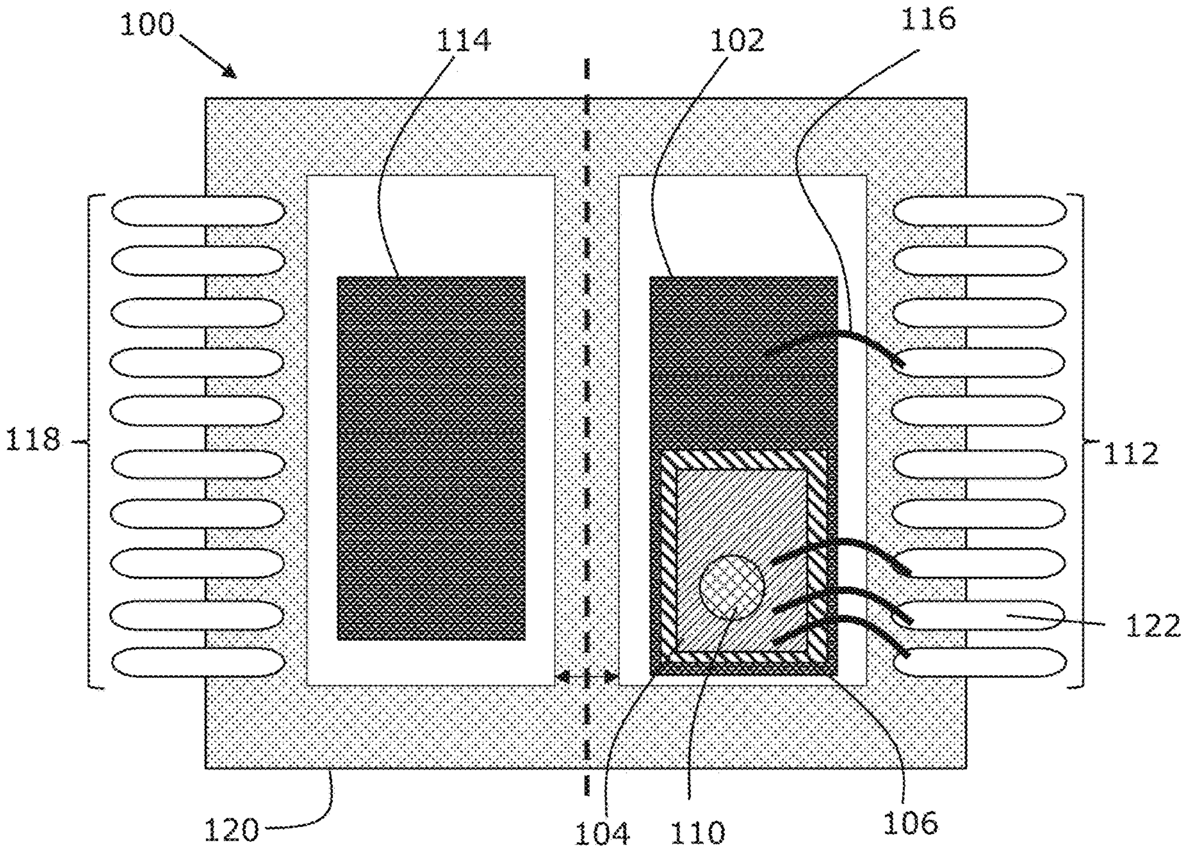
FIG. 1 shows a top view of a first example embodiment of a gate driver comprising a package containing a plurality of dies for controlling the gate of a power switch.
Figure 2:
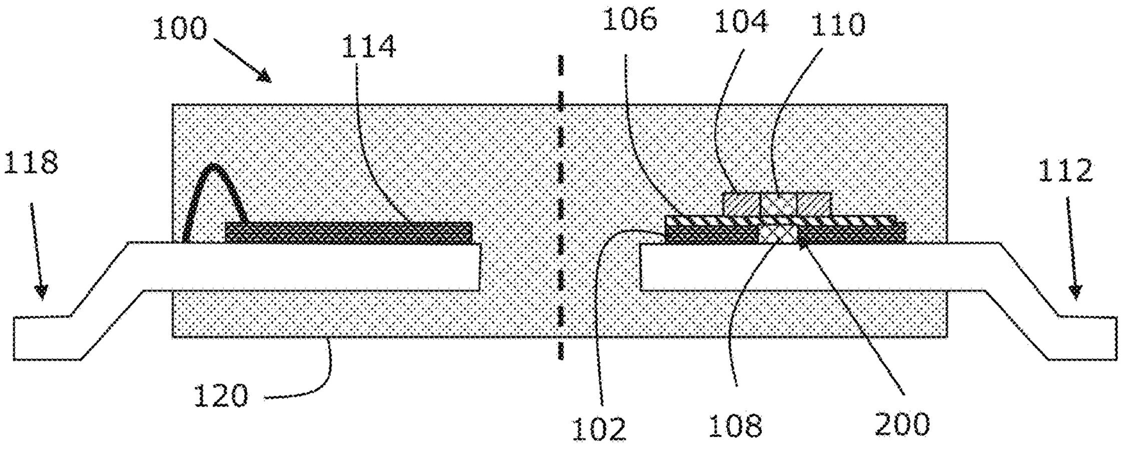
FIG. 2 shows a side view of the package of FIG. 1 indicating a stacked arrangement of the dies and a galvanically isolating layer therebetween.

Example FIGS. 1 and 2 together show a system comprising a first gate driver 100. The first gate driver 100 comprises a first die 102 including a first controller for controlling a gate of a first power switch (not shown). The first controller may be embodied by one or more electronic components provided on the first die 102. The gate driver 100 also includes a second die 104 arranged with the first die 102 and galvanically isolated therefrom. In this example, the second die 104 is stacked with the first die 102 and is galvanically isolated therefrom by a galvanic isolation layer 106 therebetween. However, more generally, the first die and the second die may be provided in the same gate driver integrated circuit package. In the present example, the second die 104 is stacked on the first die 102, although an alternative stacking is possible. The second die 104 comprising communication circuitry (not shown). The communication circuitry may be embodied by one or more electronic components provided on the second die 104. The first die 102 further includes a first connection element comprising, in this example, a first coil 108. The second die 104 includes a second connection element comprising, in this example, a second coil 110. The first and second coils 108, 110 are configured to provide for an inductively coupled communication channel through the galvanic isolation layer 106 between the first controller of the first die 102 and the communication circuitry of the second die 104. The second die 104 comprises or is coupled to at least one communication terminal 122 for coupling to a second gate driver (described later in relation to FIG. 3). The communication terminal comprises a terminal of the integrated circuit package of which the first gate driver 100 forms part. In general, the second gate driver comprises a second controller for controlling a gate of a second power switch (not shown). The inductive communication channel 200 therefore provides, in part, for communication between the first controller of the first die 102 and the second controller of the second gate driver via the communication terminal 122.

It will be appreciated that the galvanic isolation layer 106 electrically isolates the first die 102 from the second die 104 that is stacked with the first die and may be formed of an oxide layer, such as $SiO_2$. In some examples the galvanic isolation layer may be formed of a different insulating material to provide the required level of electrical isolation between the first die 102 and the second die 104. The galvanic isolation layer 106 only needs to be suitable for insulating against a relatively small voltage difference as opposed to the galvanic isolation that is required between the high voltage domain and the low voltage domain. This is because both the first die 102 and the second die 104 operate in voltage domains at similar high voltage levels.

Thus, in one or more examples, the first gate driver 100 may be configured to be operated in combination with at least one other gate driver, i.e. the second gate driver. The first gate driver 100 and the second gate driver may be considered as being complementary gate drivers. The first gate driver may comprise a high side gate driver and the second gate driver may comprise a low side gate driver of an inverter arrangement, as will be known by those skilled in the art. In general, the first controller of the first die 102 is operated in a first reference potential/supply potential corresponding to the power switch it is driving. The communication circuitry of the second die 104 may be referenced to the reference potential/supply potential of the second gate driver. Therefore, the galvanic isolation layer 106 is configured to provide a functional isolation between the first die 102 and the second die 104.

The gate driver 100 comprises a plurality of terminals 112. One or more of the terminals may couple the first controller of the first die 102 to a supply voltage and a reference voltage. One or more of the terminals 112 may provide for connection of the first controller to the gate it is configured to control. One or more of the terminals 112 may provide signalling of a fault to the first controller of the first die 102. One or more bondwires 116 may couple the respective dies 102, 104 or circuitry thereon to the terminals 112. One or more of the terminals 112 may couple the communication circuitry of the second die 104 to a different supply voltage and/or a different reference voltage.

Figure 3:
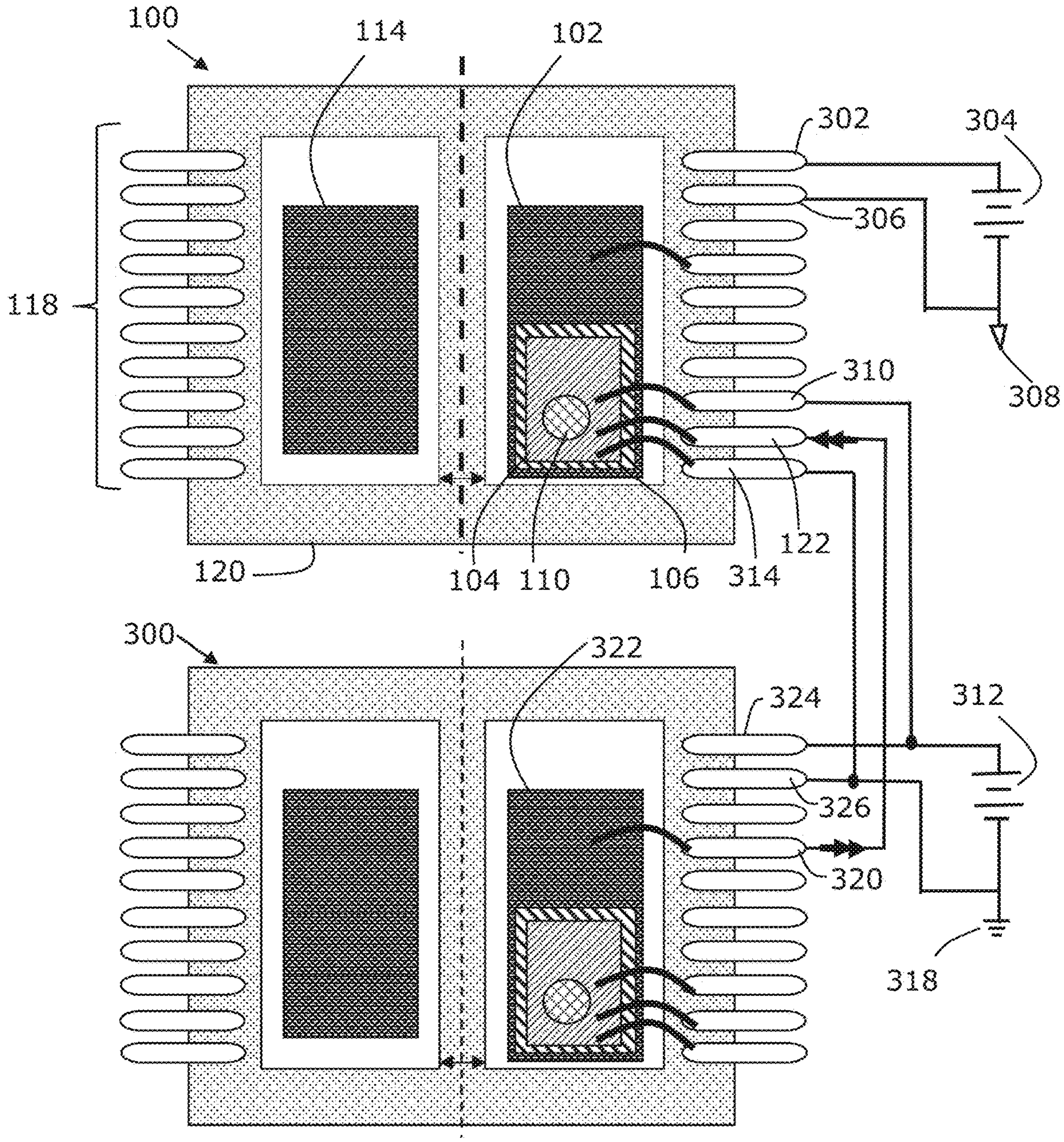
FIG. 3 shows an example arrangement of two gate drivers and shows the interconnections therebetween that allows high voltage domain communication from the second gate driver to the first gate driver.

FIG. 3 shows an embodiment in which the gate driver 100 of FIG. 1 is in combination with a second gate driver 300 and also shows the interconnections between the two gate drivers. In some embodiments the first die 102 includes a first supply voltage terminal 302 for receiving a first supply voltage 304 and a first reference terminal 306 for receiving a first reference voltage 308. FIG. 3 further shows that the second die 102 includes a second supply voltage terminal 310 for receiving a second supply voltage 312 and a second reference terminal 314 for receiving a second reference voltage 318. In some examples one or both of the first reference voltage 308 and the second reference voltage 318 are different and the first supply voltage 304 and the second supply voltage 312 are different.

Thus, it will be appreciated that the first controller of the first die 102 is configured to operate in a first high voltage domain comprising the voltage domain of the first power switch. Furthermore, the communication circuitry of the second die 102 is configured to operate in a second high voltage domain, different to the first high voltage domain, and comprising the voltage domain of the second power switch. In some examples the interface circuitry 118 of the third die 114 is configured to operate in a low voltage domain. It will be appreciated that the voltage difference between the first high voltage domain and the second high voltage domain will be much smaller than the voltage difference between either of the first or second high voltage domains and the low voltage domain.

In the present example, the first gate driver 100 may be referred to as the high-side (HS) gate driver and the second gate driver 300 may be referred to as the low-side (LS) gate driver. The high-side driver 100 and low-side driver 300 are both in the high voltage domain but receive different reference voltages.

In some embodiments the second die 102 is configured to receive at least a fault signal from the second controller (on die 322) of the second gate driver 300 via the communication terminal 122. In some embodiments the second die 104 is configured to communicate the occurrence of a fault, indicated by receipt of the fault signal, to the first controller on the first die 102 via the inductive communication channel 200. In some examples, the communication through the communication channel is uni-directional or bi-directional.

In the present example the first gate driver 100 comprises a package 120 including a third die 114, wherein the third die 114 is galvanically isolated from the first die 102 (and also the second die 104) and is communicatively coupled to the first die 102. In some examples the third die 114 includes interface circuitry to provide an interface to a microcontroller (not shown). Typically, the microcontroller operates in a low voltage domain relative to the high voltage domains of the first die 102 and the second die 104.

The example shown in FIG. 3 allows for communication between first gate driver 100 and the second gate driver 300 that are referenced to different voltages. This is a result of the second die 104 having the same reference voltage and same supply voltage as the second gate driver 300 thereby allowing for direct communication between the controllers of the gate drivers 100, 300 while the inductive communication channel 200 allows the second die 104 to communicate with the first controller of the first die 102 through the galvanic isolation layer 106.

In some embodiments, the first controller of the first die 102 is configured to communicate with the second controller selectively via the inductive communication channel 200 and the communication circuitry of the second die 104 or via the low voltage third die 114 and the microcontroller (or via a second high-voltage communication terminal 410 described later). Thus, if the speed of communication is important, such as upon occurrence of a fault, the first controller of the first die 102 may be configured to communicate with the second controller via the communication circuitry of the second die 104. Other communications may be routed through the interface circuitry of the third die 114 and onward to the microcontroller. This may allow a faster response time to detected faults. It will be appreciated that other signal types other than or in addition to fault signals may be routed via the communication channel 200. The selective communication via the communication channel 200 may be predetermined and based on the type of communication to be communicated.

It will be appreciated that the galvanic isolation required between the high voltage domain and the low voltage domain will be larger than the isolation provided by the galvanic isolation layer 106. This is because the voltage difference between the first die 102 and the second die 104 is much lower than the voltage difference between the low voltage domain and the high voltage domain.

The inductive communication channel 200 may enable control of the complementary gate driver's high voltage circuitry without intervention from the low voltage domain microcontroller and can therefore improve the efficiency and speed of the control of the complementary gate drivers. It will be appreciated that maintaining control of the gate drivers 100, 300 in the high voltage domain can allow for improved synchronisation of the gate drivers and can allow the gate drivers to react to detected faults and/or errors much more quickly compared to the use of the low voltage domain microcontroller.

The example system of FIG. 3 shows the first gate driver 100 in combination with the second gate driver 300. The second gate driver 300 comprises a fourth die 322 which includes the second controller (not shown). The second controller is coupled to a high-voltage communication terminal 320 of the second gate driver package, which in turn is coupled to the communication terminal 122 of the second die. This allows for faults detected in the second gate driver to be directly communicated to the first gate driver 100.

In the example of FIG. 3, the fourth die 322 is coupled (such as by bondwires) to a fourth supply voltage terminal 324 (of the package) for receiving the second supply voltage 312 and a second reference terminal 326 for receiving the second reference voltage 318. It will be appreciated that the second die 104 is also powered by the same second supply voltage 312 and is also coupled to the second reference voltage 318. This ensures that the fourth die 322 and the second die 104 operate in the same voltage domain and are referenced to the same ground/supply potential. This allows for direct communication between these components.

In general, the second gate driver 300 is substantially similar in structure to the first gate driver 100.

Figure 4:
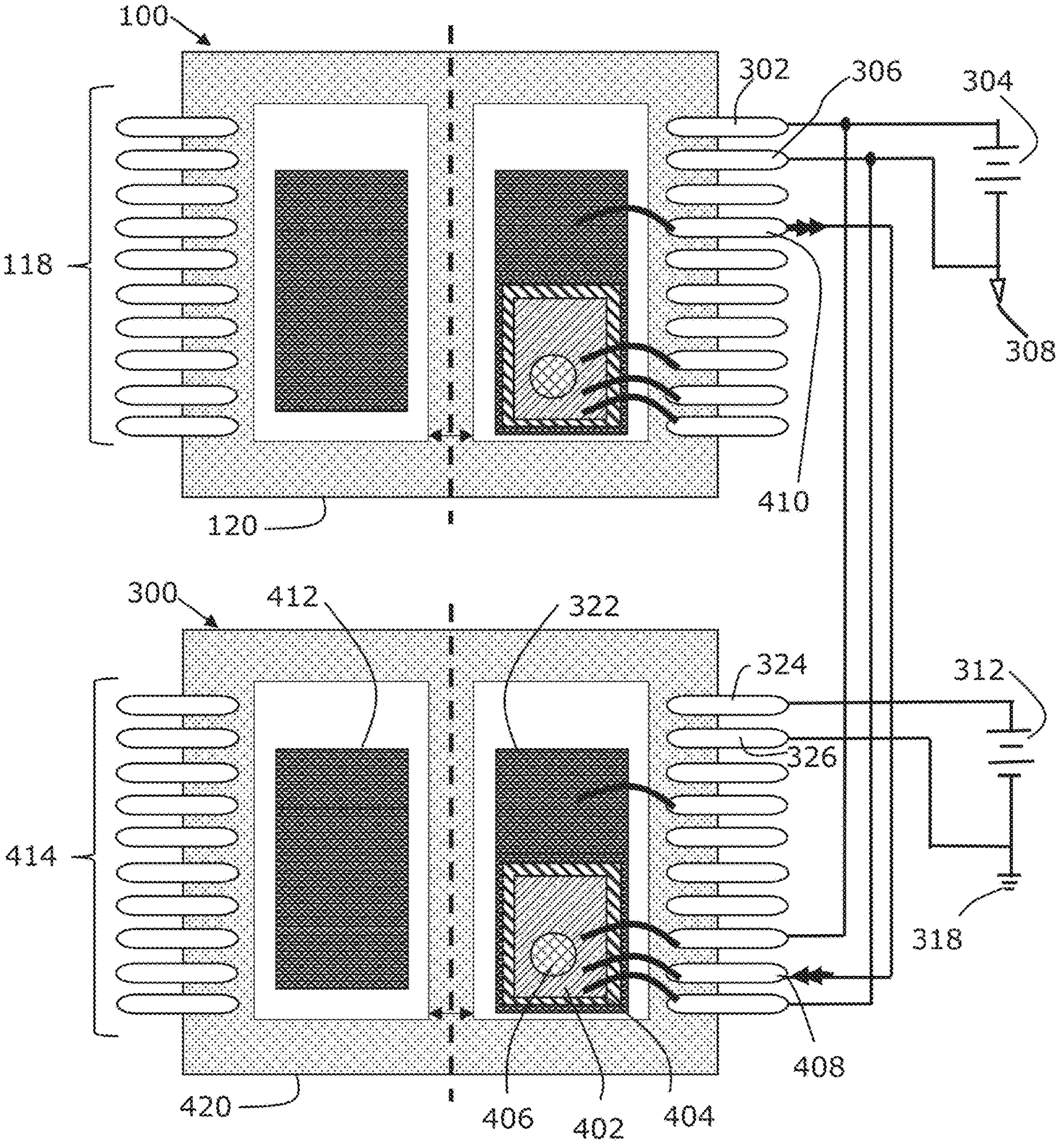
FIG. 4 shows an example arrangement of two gate drivers and shows further interconnections therebetween that allows high voltage domain communication from the first gate driver to be communicated to the second gate driver.

In the examples of FIG. 3 and FIG. 4, the second gate driver 300 includes a fifth die 402 (shown labelled in FIG. 4) stacked with the fourth die 322 and galvanically isolated therefrom by a second galvanic isolation layer 404 therebetween (analogous to the structure shown in FIG. 2). The fifth die 402 comprises second communication circuitry (not shown). The fourth die 322 includes a first coil (not shown) and the fifth die also includes a second coil 406. The first and second coils of the fourth and fifth dies respectively, are configured to provide for a second inductive communication channel through the second galvanic isolation layer 406 between the second controller of the fourth die 322 and the second communication circuitry of the fifth die 402. It will be appreciated that in other examples the first and second coils of the fourth and fifth dies may more generally comprise third and fourth connection elements providing other types of communication channel, as will be described below.

The fifth die 402 comprises at least one communication terminal 408 provided by one of the terminals of the second gate driver. The first gate driver and first die 102 also includes a second high-voltage communication terminal 410, wherein the at least one communication terminal 408 of the fifth die 402 is coupled to the second high-voltage communication terminal 410 of the first die 102 to provide for communication from the second controller of the second gate driver 300 to the first controller of the first gate driver 100 via the second inductive communication channel. Thus, the inductive communication channel provides (e.g. unidirectional) communication from the first controller of the first die to the second controller of the fourth die. The second inductive communication channel provides (e.g. unidirectional) communication from the second controller of the fourth die to the first controller of the first die.

In the embodiment shown in FIG. 4, the fifth die 402 is configured to receive at least a fault signal from the first controller of the first gate driver 100 via the second high-voltage communication terminal 410 and the at least one communication terminal 408 of the fifth die 402. Furthermore, the second communication circuitry of the fifth die 402 is also configured to communicate the occurrence of a fault indicated by receipt of the fault signal to the second controller of the second gate driver 300 via the second inductive communication channel.

In other examples, the direction of communication provided by the communication channel and the second communication channel may be reversed. In other examples, the communication channel of the first gate driver may provide for bidirectional communication between the first and second gate drivers and therefore the fifth die and the second communication channel may not be provided.

In some embodiments, the second gate driver 300 comprises a package 420 including a sixth die 412. In the example of FIG. 4 the sixth die 412 is galvanically isolated from the fourth die 322 (and the fifth die 402) and is communicatively coupled to the fourth die. The sixth die 412 includes second interface circuitry 414 to provide a low voltage interface to the microcontroller.

As will be understood, the second controller of the fourth die 322 is configured to operate in the second high voltage domain which comprises the voltage domain of the second power switch (not shown) and the voltage domain of the second die 104. Furthermore, the second communication circuitry of the fifth die 402 is configured to operate in the first high voltage domain which comprises the voltage domain of the first power switch (not shown). The second interface circuitry 414 of the sixth die 412 is configured to operate in the low voltage domain.

Figure 5:
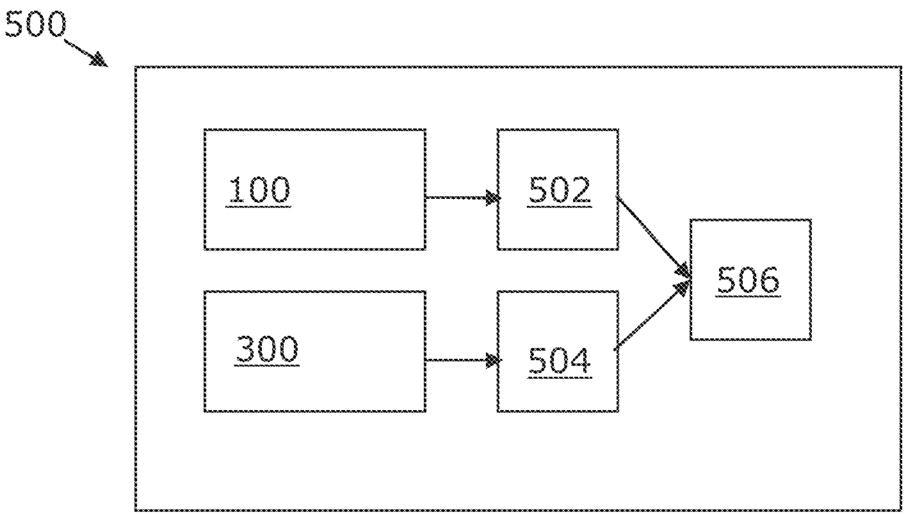
FIG. 5 shows an example system comprising the first and second gate drivers respectively coupled to first and second power switches which may control the operation of an electric motor.

FIG. 5 shows a system 500 comprising the first gate driver 100 and the first power switch 502, wherein the first gate driver 100 is coupled to a gate terminal (not shown) of the first power switch 502. FIG. 5 further shows that the system includes the second gate driver 300 and the second power switch 504, wherein the second gate driver 300 is coupled to a gate terminal (not shown) of the second power switch 504.

FIG. 5 shows an example embodiment in which the system 500 includes an electric motor 506 and wherein the electric motor 506 is powered at least in part by the first power switch 502 and the second power switch 504.

Figure 6:
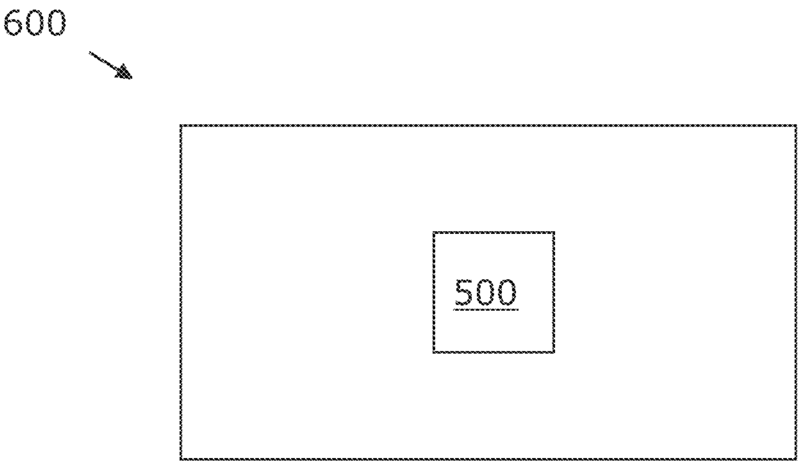
FIG. 6 shows an example of a vehicle including the system of FIGS. 4 and 5.

FIG. 6 shows an example embodiment including an electric vehicle 600 comprising the system 500 and wherein the electric motor 506 provides motive power for the electric vehicle 600.

Figure 7:
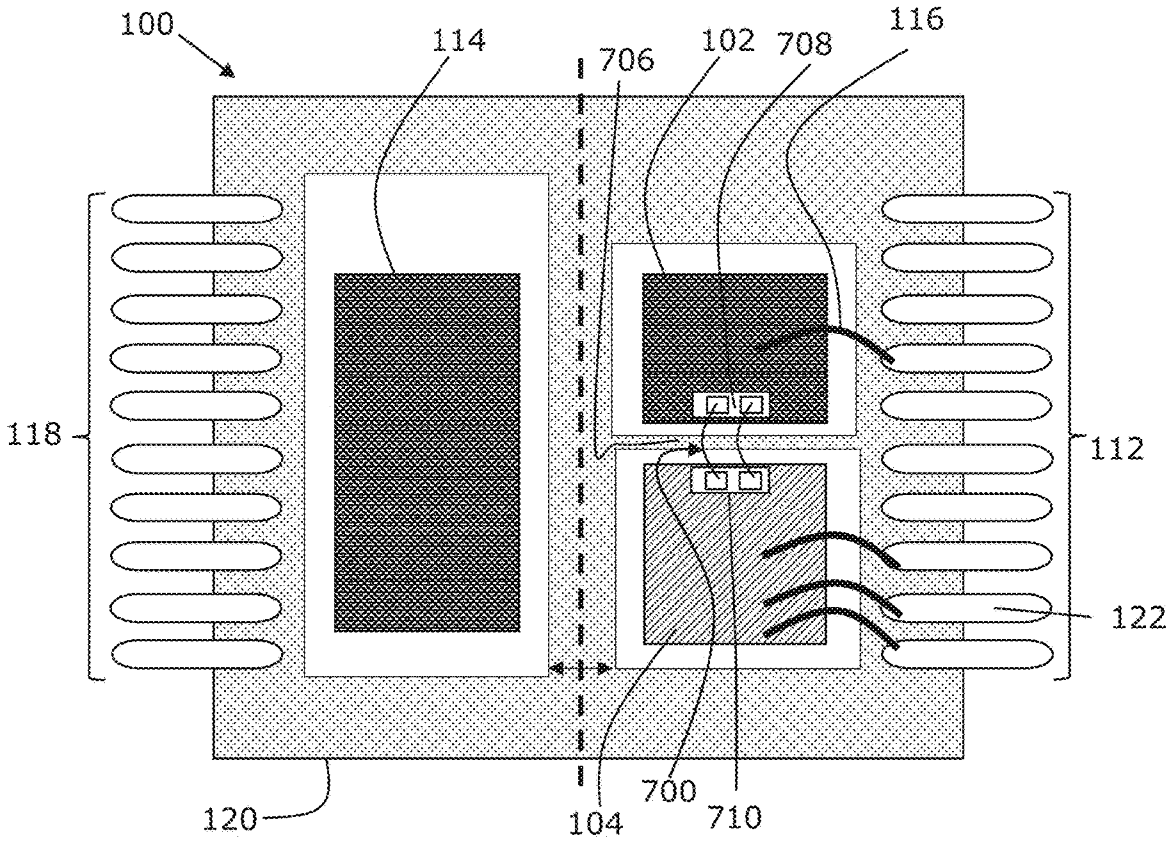
FIG. 7 shows a top view of a second example embodiment of a gate driver wherein the communication channel comprise a capacitive based communication channel.
Figure 8:
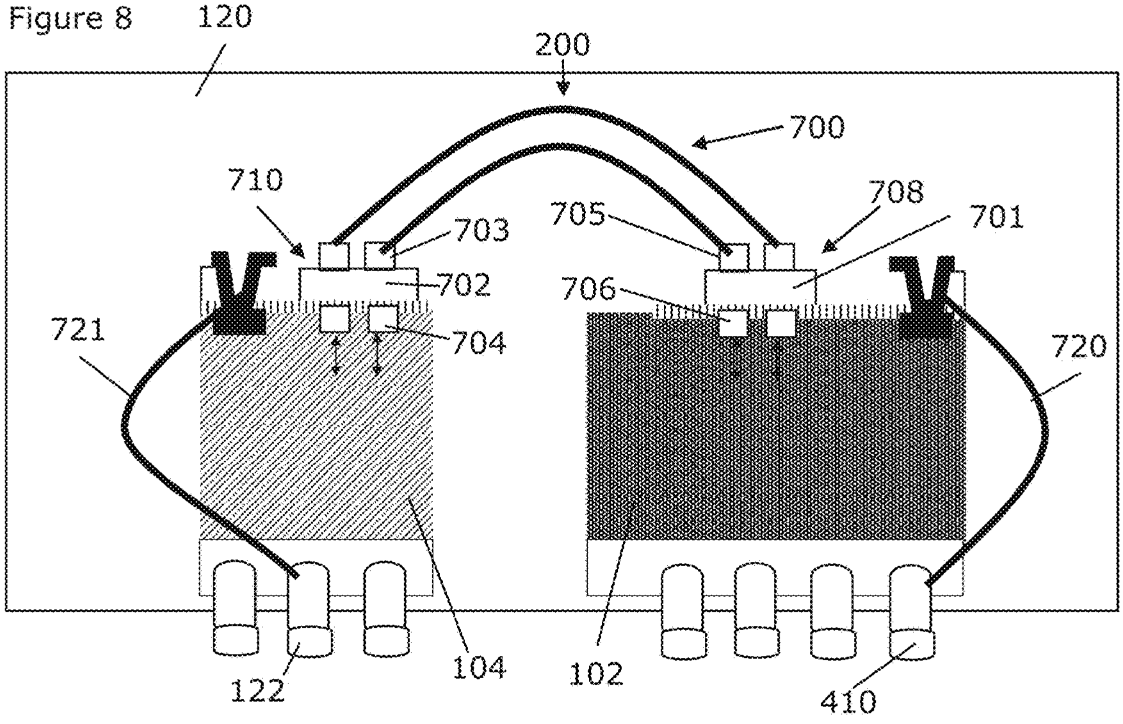
FIG. 8 shows a side view of the package of FIG. 7.

Example FIGS. 7 and 8 shows a second embodiment of the gate driver 100. The same reference numerals have been used for like parts. The differences relative to the first embodiment will be described.

In the second embodiment, the second die 104 is arranged adjacent the first die 102 rather than being stacked thereon. The first die 102 and the second die 104 are shown arranged in the same integrated circuit package 120, such as side by side. The galvanic isolation 706 is provided by the separation of the first die 102 and the second die 104 in the package 120. Package material or other insulating material may extend between the dies 102, 104.

In the second embodiment, the communication channel 200 comprises a capacitive based communication channel.

In the present example, the first connection element 708 comprises a first capacitor arrangement and the second connection element 710 comprises a second capacitor arrangement. Thus, the communication channel comprises a capacitive communication channel provided by one or more bondwires that couple the first capacitor arrangement 708 and the second capacitor arrangement 710 and the capacitor arrangements 708, 710 themselves.

In particular, the first capacitor arrangement 708 and the second capacitor arrangement 710 each comprises an isolation barrier 701, 702 formed on the first die 104 and the second die 106 as well as at least one pair 703, 704 and 705, 706 of terminals or plates that provide a capacitive coupling via the isolation barrier 701, 702. In the present example, each of the first die and the second die include two pairs of terminals or plates and two bond wires provide the connection between the respective pairs. The present example provides for bidirectional communication wherein one set of pairs and one bondwire provides for communication in one direction and the other set of pairs and other bondwire provides for communication in the other direction. However, although in other examples, only one bond wire may be provided for unidirectional or bidirectional communication.

Thus, the terminal 706 or "plate" is coupled to the first controller of the first die. Signals applied to the terminal 706 are capacitively coupled to the terminal or "plate" 705. The signals are this conveyed by the bondwire(s) 700 to the terminal or "plate" 703, which is capacitively coupled to terminal or "plate" 704. The communication circuitry embodied in the second die 104 may be coupled to the terminal 704. A similar arrangement may be provided by the other terminal pairs.

FIG. 8 also shows a bondwire 720 coupling the first controller embodied in the first die 102 to the second high-voltage communication terminal 410. FIG. 8 also shows bondwire 721 coupling the communication circuitry of the second die to the communication terminal 122. It will be appreciated that other bondwires and/or connections may be present to the other package terminals that are omitted here for clarity.

It will also be appreciated that the galvanically isolating and capacitive based communication channel may be embodied in other ways, as will be understood by those skilled in the art. For example, only one of the first connection element 708 and the second connection element 710 may comprise a capacitor arrangement, while the other may comprise a connection for receiving the bondwire 700.

The other features and operation of the gate driver 100 of FIGS. 7 and 8 is similar to the first embodiment. Accordingly, the gate driver 100 described in relation to FIGS. 7 and 8 can replace the gate drivers 100 and 300 in FIGS. 3 and 4.

Figure 9:
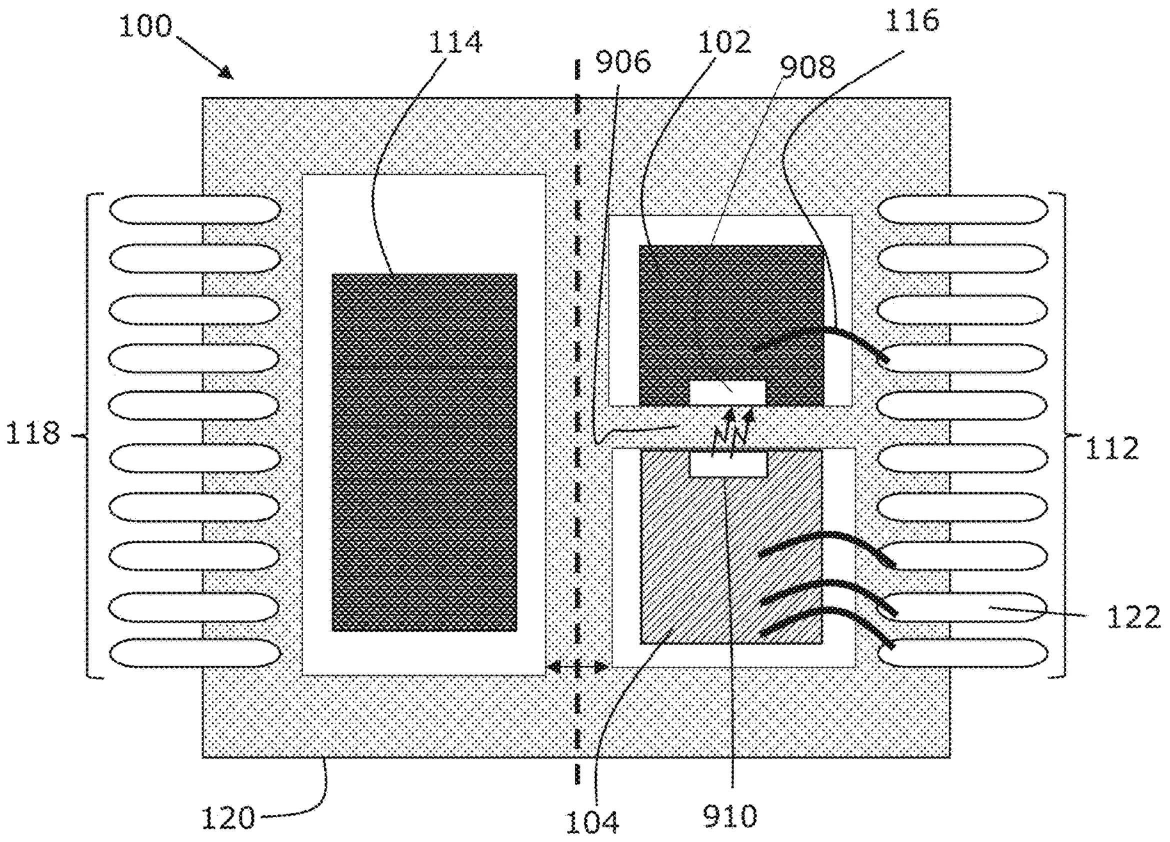
FIG. 9 shows a top view of a second example embodiment of a gate driver wherein the communication channel comprise an optical based communication channel.
Figure 10:
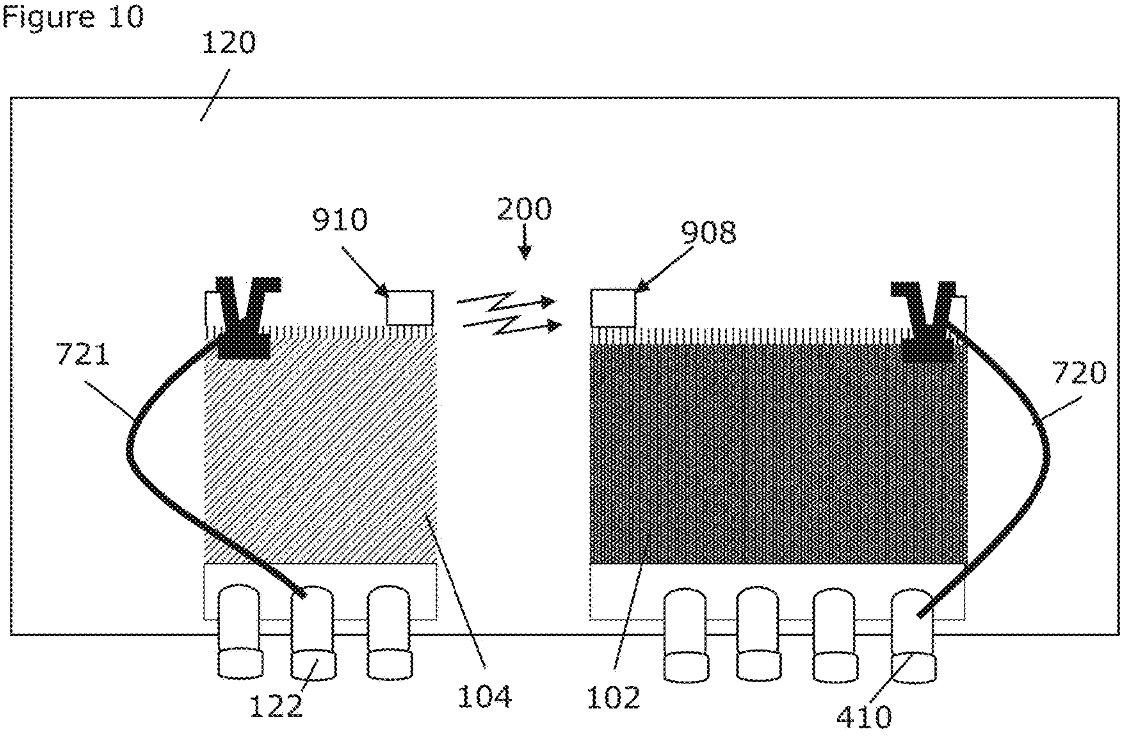
FIG. 10 shows a side view of the package of FIG. 9.

Example FIGS. 9 and 10 shows a third embodiment of the gate driver 100. The same reference numerals have been used for like parts. The differences relative to the first embodiment and the second embodiment will be described.

In the third embodiment, the second die 104 is arranged adjacent the first die 102 rather than being stacked thereon. The first die 102 and the second die 104 are shown arranged in the same integrated circuit package 120, such as side by side. The galvanic isolation 706 is provided by the separation of the first die 102 and the second die 104 in the package 120.

In the third embodiment, the communication channel 200 comprises an optical based communication channel. Thus, the first connection element 908 and the second connection element 910 comprise corresponding parts of an optocoupler arrangement.

In the third example embodiment, the first connection element 908 may comprises a photo-transistor (more generally a light detector) and the second connection element 910 may comprise a light emitting diode (more generally a light emitter). Thus, the communication channel comprises an optical communication channel provided by transmission of light between the first and second connection elements 908, 910. It will be appreciated that bidirectional communication may be provided by the first connection element 908 comprising a light emitter and a light detector and the second connection element 910 comprising a light emitter and a light detector.

The other features and operation of the gate driver 100 of FIGS. 9 and 10 is similar to the first and second embodiment. Accordingly, the gate driver 100 described in relation to FIGS. 9 and 10 can replace the gate drivers 100 and 300 in FIGS. 3 and 4. It will be appreciated that a mixture of gate driver types that provide the communication channel in different ways is also within the scope of the disclosure.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A system comprising:

a first gate driver comprising:

a first die including a first controller for controlling a gate of a first power switch;

a second die arranged with the first die and galvanically isolated from the first die, the second die comprising communication circuitry;

wherein the first die includes a first connection element and the second die includes a second connection element, wherein the first and second connection elements are configured to provide a communication channel between the galvanically isolated first die and second die; and wherein the second die is coupled to at least one communication terminal for coupling to a second gate driver comprising a second controller, the second controller for controlling a gate of a second power switch; and wherein the communication channel provides for communication between the first controller and the second controller;

wherein the second gate driver comprises a third die including the second controller, wherein the second controller includes a high-voltage communication terminal coupled to the communication terminal of the second die;

wherein the second gate driver includes:

a fourth die arranged with the third die and galvanically isolated from the third die, the fourth die comprising second communication circuitry;

wherein the third die includes a third connection element and the fourth die includes a fourth connection element, wherein the third and fourth connection elements are configured to provide a second communication channel between the galvanically isolated third die and the fourth die; and wherein the fourth die comprises at least one communication terminal;

wherein the first die includes a second high-voltage communication terminal; and wherein the at least one communication terminal of the fourth die is coupled to the second high-voltage communication terminal of the first die to provide for communication from the first controller to the second controller via the second communication channel.

2. The system of claim 1, wherein the second die is stacked with the first die and a galvanic isolation layer therebetween provides said galvanic isolation, and wherein the first connection element comprises a first coil and the second connection element comprises a second coil, wherein the communication channel is provided by the first and second coils being configured to provide an inductive communication channel through the galvanic isolation layer.

3. The system of claim 1, wherein the second die is arranged adjacent the first die, and wherein the first connection element and the second connection element comprise corresponding parts of an optocoupler arrangement, and thereby the communication channel comprises an optical communication channel.

4. The system of claim 1, wherein the second die is arranged adjacent the first die, and wherein one or both of the first connection element comprises a first capacitor arrangement and the second connection element comprises a second capacitor arrangement, wherein the communication channel comprises a capacitive communication channel further provided by one or more bondwires extending between the first capacitor arrangement and the second capacitor arrangement.

5. The system of claim 1, wherein the first die includes a first supply voltage terminal for receiving a first supply voltage and a first reference terminal for receiving a first reference voltage; and the second die includes a second supply voltage terminal for receiving a second supply voltage and a second reference terminal for receiving a second reference voltage, wherein one or both of the first reference voltage and the second reference voltage are different and the first supply voltage and the second supply voltage are different.

6. The system of claim 1, wherein the second die is configured to receive at least a fault signal from the second controller of the second gate driver via the communication terminal, wherein the second die is configured to communicate the occurrence of a fault indicated by receipt of the fault signal to the first controller via the communication channel.

7. The system of claim 1, wherein the first gate driver comprises a package including the third die, wherein the third die is galvanically isolated from the first die and the second die and is communicatively coupled to the first die, wherein the third die includes interface circuitry to provide an interface to a microcontroller.

8. The system of claim 7, wherein the first controller of the first die is configured to operate in a first high voltage domain comprising the voltage domain of the first power switch; and the communication circuitry of the second die is configured to operate in a second high voltage domain, different to the first high voltage domain, and comprising the voltage domain of the second power switch; and the interface circuitry of the third die is configured to operate in a low voltage domain.

9. The system of claim 7, wherein the first controller is configured to communicate with the second controller selectively via the communication channel and the second die or via the third die and the microcontroller.

10. The system of claim 1, wherein the third die includes a fourth supply voltage terminal for receiving the second supply voltage and a second reference terminal for receiving the second reference voltage.

11. The system of claim 1, wherein the fourth die is configured to receive at least a fault signal from the first controller of the first gate driver via the second high-voltage communication terminal and the at least one communication terminal of the fourth die, wherein the second communication circuitry of the fourth die is configured to communicate the occurrence of a fault indicated by receipt of the fault signal to the second controller via the second communication channel.

12. The system of claim 1, including:

the first gate driver and the first power switch, wherein the first gate driver is coupled to a gate terminal of the first power switch; and the second gate driver and the second power switch, wherein the second gate driver is coupled to a gate terminal of the second power switch.

13. An electric vehicle comprising the system of claim 12, the electric vehicle including an electric motor, wherein the electric motor is powered at least in part by the first power switch and the second power switch, wherein the electric motor provides motive power for the electric vehicle.

14. The system of claim 1, wherein the first gate driver comprises a package including a third die, wherein the third die is galvanically isolated from the first die and the second die and is communicatively coupled to the first die, wherein the third die includes interface circuitry to provide an interface to a microcontroller.

15. The system of claim 7, including the second gate driver comprising a fourth die including the second controller, wherein the second controller includes a high-voltage communication terminal coupled to the communication terminal of the second die.

16. The system of claim 7, wherein the first die includes a first supply voltage terminal for receiving a first supply voltage and a first reference terminal for receiving a first reference voltage; and the second die includes a second supply voltage terminal for receiving a second supply voltage and a second reference terminal for receiving a second reference voltage, wherein one or both of the first reference voltage and the second reference voltage are different and the first supply voltage and the second supply voltage are different.

17. The system of claim 1, wherein the first power switch and the second power switch comprise part of a respective limb of an inverter.

18. The system of claim 17, wherein the inverter is configured to convert DC power to AC power for application to an electric motor.

* * * * *